United States Patent Office 3,090,905
Patented May 21, 1963

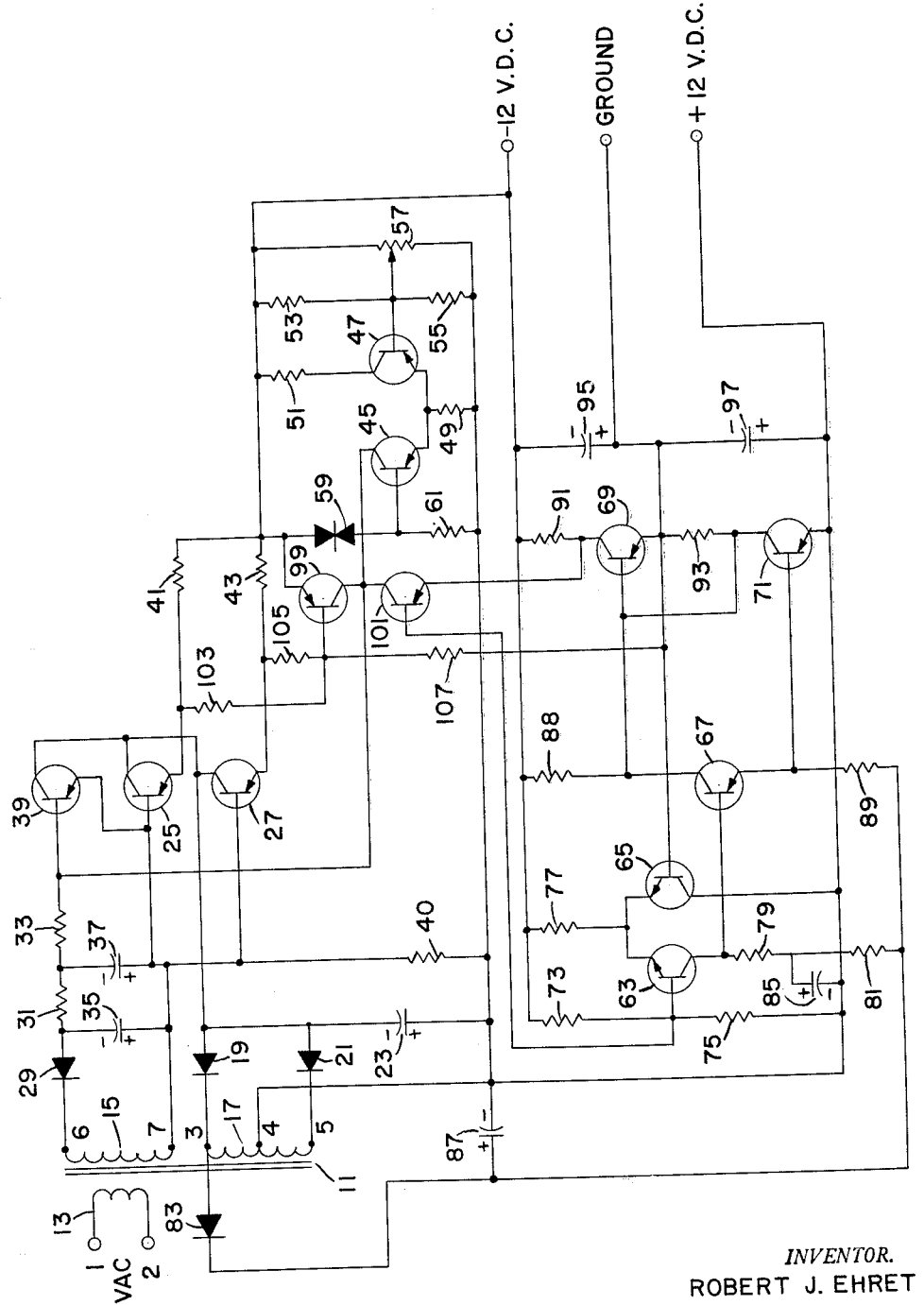

3,090,905
POWER SUPPLY OVERLOAD PROTECTOR
Robert J. Ehret, Los Altos, Calif., assignor to Ampex Corporation, Redwood City, Calif., a corporation of California
Filed Aug. 13, 1959, Ser. No. 833,503
4 Claims. (Cl. 323—22)

This invention relates to regulated power supplies with overload protection and more particularly regulated power supplies having both positive and negative outputs with overload protection for each output as well as for the overall circuit.

In power supplies utilizing a series impedance regulating element, for providing regulated output power a short circuited or overloaded output can cause considerable damage to the series regulating impedance elements. In order to prevent damage to the series regulating impedance element numerous circuits have been proposed which, for the most part, either require relays or merely limit the output current to its full load value.

It is, therefore, a general object of this invention to provide a current limiting circuit for power supplies.

It is an object of this invention to provide an improvement in overload protection for power supplies, which does not use relays or fuses and allows the power supply to operate into a short circuit without unduly increasing the internal dissipation of the series element.

It is a further object of the invention to provide an improvement in overload protection for power supplies having dual outputs, in which the protection is afforded not only for overload on the entire power supply but an overload on either of the dual outputs.

It is still another object of this invention to provide a regulated power supply having a dual output wherein an overload on one side will not cause excessive voltage in the opposite side.

It is still another object of this invention to provide a series regulated power supply which is capable of operating into a short circuit without unduly increasing the internal dissipation of the series element.

These and other objects of the invention will become more apparent from the following description when taken in conjunction with the accompanying drawing wherein the single FIGURE is a schematic diagram of the circuit utilizing one embodiment of the invention.

DESCRIPTION OF THE CIRCUIT

Referring to the figure, the regulated power supply includes a transformer 11 having a primary winding 13 and secondary windings 15 and 17. The secondary winding 17 is connected to a full wave rectifier circuit which includes the rectifiers 19 and 21 and the capacitor 23. The rectified and filtered power is serially applied to one of a plurality of output terminals of what shall hereinafter be referred to as a dual power supply through the parallel regulating transistors 25 and 27. The secondary winding 15 is connected to a half wave rectifier filter circuit including diode 29, resistors 31 and 33 and the capacitors 35 and 37. Current from the secondary winding 15, thus rectified and filtered, supplies base current to the transistor 39. The transistor 39, in turn, supplies base current to the transistors 25 and 27 through the emitter of transistor 39. The emitter of transistor 39 is also connected to the positive terminal through the resistor 40. The emitters of transistors 25 and 27 are connected to the negative terminal of the regulated power supply through the resistors 41 and 43 respectively. The center tap of secondary winding 17 is connected directly to the positive output terminal.

Voltage regulation is obtained in the circuit by a feedback amplifier including transistors 45, 39, 25, 27 and 47. The emitters of transistors 45 and 47 are connected to the positive output terminal through the resistor 49. The collector of transistor 47 is connected to the regulating or negative output terminal through the resistor 51, while the base of transistor 47 is connected to the junction of resistors 53 and 55, being connected in turn to the negative and positive terminals respectively. The potentiometer 57 is likewise connected between the negative and positive terminals, with the wiper being connected to the base of the transistor 47. The collector of transistor 45 is connected directly to the base of transistor 39, while the base of transistor 45 is connected to the junction of the Zener diode 59 and resistor 61. The other side of the Zener diode 59 is connected to negative terminal while the other side of the resistor 61 is connected to the positive terminal.

The output of the above mentioned circuit is center tapped by the circuit including the transistors 63, 65, 67, 69 and 71 and which serves to pass any unbalanced currents between the + and − supply. The use of the feedback center tap circuit provides a low output impedance. Across the negative and positive terminals are connected the series resistors 73 and 75 the junction of which is connected to the base of the transistor 63. The emitters of the transistors 63 and 65 are connected to the negative terminal through the resistor 77. The collector of the transistor 63 is connected to one end of the secondary winding 17 through the resistors 79 and 81 and the rectifier 83. The junction of the resistors 79 and 81 is connected to the positive terminal through the capacitor 85, while the junction of the resistor 81 and the rectifier 83 is connected to the positive terminal through the capacitor 87. The collector of the transistor 65 is connected directly to the positive terminal. The base of the transistor 67 is tied to the collector of the transistor 63 while the collector of the transistor 67 is connected to the negative terminal through the resistor 88. The emitter of transistor 67 is connected to the rectifier 83 through the resistor 89. The transistors 69 and 71 are connected in push-pull between the negative and positive terminals through the resistors 91 and 93. The base of the transistor 69 is connected to the collector of the transistor 67 and to the collector of transistor 71. The junction of the resistor 93 with the emitter of the transistor 69 is connected to the base of transistor 65. The base of transistor 71 is tied to the emitter of transistor 67. Capacitors 95 and 97 are connected from the ground terminal to the negative and positive terminals respectively.

The overload protection circuit includes transistors 99 and 101. The collectors of each of these transistors are tied to the base of the transistor 39. The emitter of transistor 99 is tied to the negative terminal while the base of transistor 99 is connected to the emitters of transistors 25 and 27 through resistors 103 and 105 respectively. The base of the transistor 99 is also connected to the ground terminal through the resistor 107. The base of transistor 101 is connected to the junction of resistors 73 and 75 while the emitter of transistor 101 is connected to the collector of transistor 69.

OPERATION OF THE CIRCUIT

In operation an alternating current source is applied to the primary 13 of the transformer 11. The alternating current voltage is transformed to the secondary winding 17, rectified by the diodes 19 and 21 and applied to capacitor 23. The rectified voltage is passed directly to the positive terminal and to the negative terminal through the series regulating transistors 25 and 27 and corresponding resistors 41 and 43. Current from the secondary winding 15 supplies the base of transistor 39 through the bias supply including the diode 29, capacitors 35 and 37 and resistor 31. The transistor 39 provides amplification of the error signal from transistor 45.

A variation in the voltage across the negative and positive terminals will be impressed across the bases of transistors 45 and 47, but a larger variation will appear at the base of 45 due to the Zener diode. An increase in the voltage across the negative and positive terminals will cause a greater increase of negative voltage at the base of the transistor 45 thereby causing that transistor to conduct heavier. The additional conduction by the transistor 45 will cause a decrease in the base current of transistor 39 and resulting in less current in the transistors 25 and 27. This will tend to cause a consequent lowering of the voltage at the negative and positive terminals and restore the output nearly to its original value.

In order to provide temperature compensation, the transistor 47 is utilized. Any variation in the conduction rate of transistor 45 due to temperature variation will be compensated by the conduction rate of transistor 47 which has a common emitter resistance with transistor 45 and believes in a like manner.

The resistors 73 and 75 which are connected across the negative and positive terminals serves to center tap output voltage. Positive voltage is supplied to the collector of transistor 63 and the emitter of transistor 67 from a bias supply which includes the diode 83 and the capacitor 87. The potential at the base of the transistor 63 held at one-half the output by the voltage divider comprising the resistors 73 and 75. The collector current of transistor 63 provides base current to transistor 67 which in turn provides base current for the transistors 69 and 71. Variations in the current to transistors 69 and 71 cause consequent variations in voltage at the base of the transistor 69 and consequently the emitter of transistor 69. The voltage at the ground point is applied to the base of transistor 65. Variations in the current to transistor 65 cause variations in the voltage across the resistor 77 thereby providing a feedback emitter bias to the transistor 63.

As illustrated, the feedback center tap circuit includes the resistor 93 which is serially connected between the collector of the transistor 71 and the junction of the conductors leading to the base of the transistor 65 and the emitter of the transistor 69. Accordingly, when drift causes a variation in the amount of conduction of either or both of the transistors 69 or 71, a variation is effected in the voltage developed across the resistor 93. This variation in the voltage drop across resistor 93 is reflected at the base of the transistor 65 and the bias on this transistor is accordingly altered to either increase or decrease the conduction thereof. The resistor 77, as shown in the drawing, is connected between the negative output terminal and the junction of the emitters of the transistors 63 and 65. This resistor serves as an emitter biasing element for these transistors. Therefore when the bias on the base of the transistor 65 is altered, a variation in the state of conduction of this transistor will take place. As a result, the amount of current flowing through the resistor 77 to the emitter of transistor 65 will also be effected thereby causing a change in the magnitude of the voltage developed across this resistor. As clearly shown in the drawing, the voltage developed across the resistor 77 establishes the emitter bias for the transistor 63 which, as previously pointed out, controls the conduction of the transistor 67 and accordingly the transistors 69 and 71. Therefore a feedback bias voltage due to variations in the conductive states of either or both of transistors 69 and 71 causes the transistor 63 to conduct to a greater or lesser extent to compensate for and correct this variation in the conduction of these transistors.

The transistors 99 and 101 which are normally non-conducting serve to provide overload protection to the circuit. The transistor 99 operates when a short circuit or a low impedance is placed across the entire supply or from the negative terminal to the ground terminal. The transistor 101 operates during an overload from the positive terminal to the ground terminal. A positive "turn off" bias is applied to the base of transistor 99 through the resistors 103, 105 and 107. During an overload condition, the voltage developed across the resistors 41 and 43 counteracts this "turn off" bias. Consequently, the transistor 99 conducts. The collector current of the transistor 99 during conduction causes a decrease in the base current of the transistor 39 and a decrease in the overall output of the circuit.

The decreased output will cause a decrease in the voltage across the resistors 41 and 43. This alone tends to allow the transistor 99 to conduct less. However, the "turn off" bias applied through the resistors 103, 105 and 107 also decreases with a decrease in overall output. This latter decrease, being more prominent, causes the transistor 99 to conduct even heavier and the overall output is lowered still more. Thus a regenerative effect is accomplished whereby an overload across the power supply will cause a decrease in the output current and voltage.

If there is an overload between the center tap and the negative terminal, the cutoff bias is removed by effectively connecting the lower end of resistor 107 to the emitter of transistor 99. Again the transistor 99 will be allowed to conduct and the output will be the same as in the previous instance.

The emitter of transistor 101 is normally negative with respect to its base due to the connection of the base to the center tap of the resistors 73 and 75 and the emitter connection to the negative volt terminal through the resistor 91. In the event of a short circuit between the positive terminal and ground, the transistor 99 will be further cut off due to the connection between the lower end of resistor 107 being effectively shorted to the positive terminal. The current to the transistor 69 will increase until that point where the voltage dropped across resistor 91 is such as to provide a voltage at the emitter of transistor 101 more positive than the base voltage. At this point the transistor 101 begins to conduct thereby robbing current from the base of the transistor 39. Consequently, the transistor 39 will conduct at a lower rate and the power supply will reduce the output and limit of the voltage between the negative and the ground terminal.

SPECIFIC EMBODIMENT

A circuit in conformance with the above description was built and tested using the following components and voltage.

Voltage:
    VAC _____115 volts

Transistors:
    25 _____ 2N379
    27 _____ 2N379
    39 _____ 2N379
    45 _____ 2N655
    47 _____ 2N655
    63 _____ 2N446A
    65 _____ 2N446A
    67 _____ 2N655
    69 _____ 2N379
    71 _____ 2N379
    99 _____ 2N655
    101 _____ 2N655

Zeners:
    59 _____ 1N429

Diodes:
    19 _____ TM–11
    21 _____ TM–11
    29 _____ PS–010
    83 _____ PS–010

Resistors:

| | |
|---|---|
| 31 | ohms 2200 |
| 33 | do 1500 |
| 40 | do 2000 |
| 41 | do 1 |
| 43 | do 1 |
| 49 | do 1000 |
| 51 | do 220 |
| 53 | do 619 |
| 55 | do 1780 |
| 57 | potentiometer 20K |
| 61 | ohms 2200 |
| 73 | do 1000 |
| 75 | do 1000 |
| 77 | do 2200 |
| 79 | do 680 |
| 81 | do 15K |
| 87 | do 300 |
| 89 | do 6.8K |
| 91 | do 25 |
| 93 | do 25 |
| 103 | do 1000 |
| 105 | do 1000 |
| 107 | do 8200 |

Capacitors:

| | Microfarads |
|---|---|
| 23 | 2000 |
| 35 | 50 |
| 37 | 100 |
| 85 | 50 |
| 87 | 20 |
| 95 | 2000 |
| 97 | 2000 |

Transformer: 11 Primary: 115 volts; secondary: 13 volts and 53 volts center tapped.

With the above components the output voltage was +12 volts and −12 volts, a short was placed between the negative terminal and ground. The voltage from the positive terminal to ground was about 11 volts under the circumstances. With the positive terminal shorted to ground the voltage between the negative terminal and ground was −4.5 volts.

I claim:

1. In combination with a regulated power supply having three output terminals with a first terminal being negative with respect to a second terminal and a third terminal being positive with respect to the second terminal and having a current-passing element in series with one of the first and third terminals; an overload protection circuit comprising a first variable conductance device coupled between a control element of the current-passing element and the first terminal, a voltage divider connected between the first and second terminals with an intermediate point coupled to a control element of the first variable conductance device for normally biasing the device in a nonconductive state, means connected in series with the current-passing element for sensing the value of current flow and altering the effect of the biasing of the first variable conductance device to provide conduction thereof at a predetermined value of current flow, a second variable conductance device coupled between the control element of the current-passing element and, through a first resistor, the first terminal, and bias means coupled to the second variable conductance device for normally biasing the device in a nonconductive state, said bias means including an element sensitive to overload conditions between the second and third terminals to altar the state of the second variable conductance device to one of conduction, conduction of the first and second devices thereby decreasing the current-passing ability of the current-passing element.

2. The combination of claim 1 wherein the first variable conductance device is a transistor having base, collector, and emitter electrodes with the collector connected to the control element of the current-passing element, the emitter connected to the first terminal, and the base connected to the intermediate point of the voltage divider.

3. The combination of claim 2 wherein the second variable conductance device is a transistor having base, collector, and emitter electrodes with the collector connected to the control element of the current-passing element, the emitter connected through a second resistor to the first terminal, and the base connected to a center tap of a second voltage divider connected between the first and third terminals.

4. The combination of claim 3 wherein the element sensitive to overload conditions between the second and third terminals provides a current path including the second resistor.

References Cited in the file of this patent

UNITED STATES PATENTS

| | | |
|---|---|---|
| 2,772,387 | Liguori | Nov. 27, 1956 |
| 2,776,382 | Jensen | Jan. 1, 1957 |
| 2,780,734 | Gamble | Feb. 5, 1957 |
| 2,809,301 | Short | Oct. 8, 1957 |
| 2,904,742 | Chase | Sept. 15, 1959 |
| 2,915,693 | Harrison | Dec. 1, 1959 |